United States Patent
Kidambi

(10) Patent No.: US 8,883,073 B2
(45) Date of Patent: Nov. 11, 2014

(54) METHOD OF USING SULFUR-BASED CORROSION INHIBITORS FOR GALVANIZED METAL SURFACES

(75) Inventor: Srikanth S. Kidambi, Naperville, IL (US)

(73) Assignee: Nalco Company, Naperville, IL (US)

( * ) Notice: Subject to any disclaimer, the term of this patent is extended or adjusted under 35 U.S.C. 154(b) by 506 days.

(21) Appl. No.: 12/944,783

(22) Filed: Nov. 12, 2010

(65) Prior Publication Data

US 2011/0059241 A1   Mar. 10, 2011

Related U.S. Application Data

(63) Continuation of application No. 11/612,901, filed on Dec. 19, 2006, now abandoned.

(51) Int. Cl.
| | |
|---|---|
| C23F 11/00 | (2006.01) |
| C23F 11/16 | (2006.01) |
| C23F 14/02 | (2006.01) |
| C23C 2/26 | (2006.01) |
| C23F 11/173 | (2006.01) |
| C23F 11/08 | (2006.01) |
| C02F 1/68 | (2006.01) |

(52) U.S. Cl.
CPC ............. *C23F 11/165* (2013.01); *C23F 11/16* (2013.01); *C02F 2303/14* (2013.01); *C23F 14/02* (2013.01); *C23C 2/26* (2013.01); *C23F 11/173* (2013.01); *C02F 2303/08* (2013.01); *C23F 11/161* (2013.01); *C23F 11/08* (2013.01); *C02F 1/68* (2013.01)
USPC ............................................. 422/14; 422/7

(58) Field of Classification Search
CPC ........................................................ C23F 11/16
USPC ................................................... 422/7, 14
See application file for complete search history.

(56) References Cited

U.S. PATENT DOCUMENTS

| | | | |
|---|---|---|---|
| 3,166,527 A * | 1/1965 | Ender ........................... 523/435 |
| 3,696,049 A | 10/1972 | Hausler et al. | |
| 5,407,597 A | 4/1995 | Busch et al. | |
| 5,414,123 A | 5/1995 | Hamilton et al. | |
| 5,969,019 A * | 10/1999 | Kanai et al. .................. 524/140 |
| 6,183,649 B1 | 2/2001 | Fontana | |
| 6,241,830 B1 * | 6/2001 | Shimakura et al. ........... 148/251 |
| 6,342,295 B1 | 1/2002 | Kobayashi | |
| 6,468,470 B1 | 10/2002 | Oldsberg et al. | |
| 6,818,313 B2 | 11/2004 | Phelps et al. | |
| 7,029,762 B2 * | 4/2006 | Ishizuka et al. ............... 428/659 |
| 7,390,564 B2 | 6/2008 | Yuasa et al. | |
| 2002/0022091 A1 * | 2/2002 | Marten et al. ................. 427/331 |
| 2004/0231754 A1 * | 11/2004 | Phelps et al. .................. 148/245 |
| 2004/0255819 A1 * | 12/2004 | Sinko ......................... 106/14.42 |
| 2005/0244660 A1 * | 11/2005 | Yuasa et al. ................... 428/457 |
| 2008/0199714 A1 * | 8/2008 | Witteler et al. ............... 428/545 |

OTHER PUBLICATIONS

"Guidelines for Treatment of Galvanized Cooling Towers to Prevent White Rust," Cooling Tower Institute, CTI Bulletin PFM—142, 1994.

Huntsman Corporation, "The JEFFAMINE™ Polyetheramines," Technical Bulletin, available prior to Dec. 19, 2006.

Huntsman Corporation, "JEFFAMINE™ D-230 Polyetheramines," Technical Bulletin, available prior to Dec. 19, 2006.

Pye, W. A., "Performance Evaluation of Epoxy-Coated Reinforcing Steel and Corrosion Inhibitors in a Simulated Concrete Pore Water Solution," Thesis, Master of Science in Civil Engineering, Virginia Polytechnic Institute and State University, Feb. 14, 1997.

Rajappa, Shanthamma K. and Venkatesha, Thimmappa V., "Inhibition Studies of a Few Organic Compounds and Their Condensation Products on the Corrosion of Zinc in Hydrochloric Acid Medium," Turk J. Chem., vol. 27, pp. 189-196, 2003.

Yurt, A. et al., "Inhibition Efficiency pf Schiff Bases Containing Pyridyl Group as HCL Corrosion Inhibitors for Low Carbon Steel," Advanced Batteries and Accumulators Meeting, 2004.

Database CAPLUS on STN, Acc. No. 2006:1106115, Xu et al., Macromolecules (2006), 39(23), p. 8178-8185 (Abstract).

\* cited by examiner

*Primary Examiner* — Regina M Yoo

(57) ABSTRACT

A composition and method for inhibiting white rust formation on galvanized surfaces. The composition includes thiols, polymeric dithiocarbamates, and xanthates. The composition may be introduced onto the galvanized surface, especially in an industrial water system, using a variety of different methods or programs including integrating with current programs or developing a new program.

11 Claims, No Drawings

METHOD OF USING SULFUR-BASED CORROSION INHIBITORS FOR GALVANIZED METAL SURFACES

CROSS-REFERENCE TO RELATED APPLICATIONS

This is a continuation application of application Ser. No. 11/612,901, titled, "Method of Using Sulfur-Based Corrosion Inhibitors for Galvanized Metal Surfaces," filed Dec. 19, 2006 now abandoned.

TECHNICAL FIELD OF THE INVENTION

This invention relates generally to inhibiting corrosion on galvanized metal surfaces. More specifically, the invention relates to a method for inhibiting white rust corrosion on galvanized surfaces. The invention has particular relevance for inhibiting white rust corrosion by using sulfide-based compounds on galvanized metal surfaces in industrial water systems.

BACKGROUND OF THE INVENTION

Galvanization is a protective zinc coating that is chemically bonded to a metal (usually iron or steel) surface. Zinc coating is used in a variety of applications and offers a certain degree of corrosion protection for the underlying metal by providing a mechanical barrier to the elements and environment as well as electrochemical resistance to corrosion. Several galvanizing methods exist, such as electroplating, continuous galvanization, and hot-dip galvanization. Many industrial water systems, such as cooling water circulation systems (sometimes referred to herein as "cooling towers"), have such galvanized surfaces.

A common problem with galvanized coatings of all kinds is "white rust," which manifests itself as a white, waxy, fluffy, or powdery non-protective and porous deposit that rapidly forms on galvanized surfaces when the surface is exposed to humid and/or wet conditions. White rust can cause considerable damage to the zinc coating and is also detrimental to the coating's appearance. If left unchecked, white rust will continually corrode affected galvanized surfaces and eventually lead to early failure of the coating. With such a non-protective, porous deposit on the galvanized surface, the surface is not "passive" to future white rust formation and may rapidly continue to corrode.

Increased popularity of high alkalinity, no pH control water treatment programs have resulted in more frequent and severe white rust corrosion issues, especially in cooling tower applications. White rust typically forms if a new cooling tower is operated with water at a pH greater than 8.0 for an extended period before a "basic zinc carbonate" protective barrier forms. To ensure long service life, the galvanized surfaces in cooling towers typically must be allowed to "passivate" or form a protective barrier prior to initial operation or start-up. Proper water treatment and start-up procedures are also essential. One way to passivate the surfaces is to allow the zinc coating to develop a natural nonporous surface of basic zinc carbonate during initial start-up of the cooling tower. This natural chemical barrier helps prevent or slow further rapid corrosion of the zinc coating from the environment as well as from normal cooling tower operation.

This basic zinc carbonate barrier, believed to be a zinc carbonate/zinc hydroxide compound (as discussed in "Guidelines for Treatment of Galvanized Cooling Towers to Prevent White Rust," published by the Cooling Tower Institute in June 1994) typically forms within eight weeks of initial cooling tower operation with water of neutral pH (i.e., pH 6.5 to 8.0) and moderately hard water environment. A typical solute content range would be calcium ($CaCO_3$) content of 100 ppm to 300 ppm as bicarbonate alkalinity and about 100 ppm $CaCO_3$ hardness. Formation of the protective zinc carbonate barrier is important for the cooling tower to resist further corrosion. Barrier absence could result in severe white rust formation and have a significant negative impact on the cooling tower's service life.

White rust is also a form of zinc carbonate that has a different porous structure, rate of formation, and density than the protective zinc carbonate barrier described above. If the water hardness levels, measured by $CaCO_3$ hardness, reach levels below 50 ppm (i.e., soft water), accelerated zinc corrosion generally results. Certain ionic content in the water, such as sulfates, chlorides, and nitrates at levels greater than about 250 ppm may also contribute to accelerated zinc corrosion. Thus, routine inspection of the cooling tower coupled with adequate control of the water chemistry aids in the prevention of white rust formation.

Current white rust corrosion prevention programs include a combination of pre-passivating the cooling tower combined with ongoing water chemistry management to support the viability of the passivation layer. In addition to the basic zinc carbonate protective layers, as described above, white rust preventatives include pretreatment with inorganic phosphate and chromate passivation. Such inorganic solutions have limited effectiveness and are steadfastly becoming the object of federal and local regulations due to environmental concerns.

Other solutions for white rust prevention include using selective thiocarbamates, organo-phosphorous compounds, and tannins to passivate the surface. For example, U.S. Pat. No. 5,407,597 provides a formulation including a mixture of an organophosphorous compound, a thiocarbamate compound, and soluble metal salt compound. The components of this formulation are used as a combination and the ingredients tested alone typically do not control white rust formation. The formulation in U.S. Pat. No. 6,468,470 B1 includes a multi-component system of an organophosphorous compound, a tannin compound, and a soluble salt of a metal.

Moreover, under normal operating conditions, cooling towers have substantial evaporative water loss. As a result, large quantities of "make-up" water are introduced into the system that commonly contains ionic species, such as calcium, magnesium, sulphate, and chloride. Increased alkalinity (e.g., carbonate, bicarbonate, and hydroxide ions) may also cause white rust corrosion. Particularly, accumulation of carbonate alkalinity, with a concomitant pH increase, creates an ideal white rust-forming environment. This accumulation is one of the major causes of white rust. The presence of excess anions and/or soft water can aggravate the degree of white rust formation by, for example, reacting with the zinc coating to produce zinc hydroxide.

As an integral component of cooling water circulation systems biocides are essential is preventing algal, bacterial, and fungal contamination of the systems. Some of these biocides sometimes promote white rust formation as a byproduct because they chemically react with certain white rust inhibitors and/or with the zinc coating. For example, sodium hypochlorite (i.e., bleach) is a common biocide and is highly reactive.

Because high pH levels are also contributing factor to white rust formation, the addition of a sufficient quantity of free acid, commonly sulfuric acid, to the cooling water helps preclude the formation of white rust. Such free acid addition creates concerns for those handling the free acid and also creates potential for metal corrosion from the acid itself due to overfeed or spillage. None of these passivation or maintenance procedures described above provides a complete solution to the white rust problem. There thus exists a need to provide efficient and improved compositions and methods of inhibiting white rust corrosion.

SUMMARY

Accordingly, this invention provides a method of preventing corrosion on galvanized metal surfaces. The method includes introducing an effective amount of a corrosion-inhibiting composition having a sulfur-based, preferably sulfide-based, white rust corrosion-inhibiting compound onto a galvanized metal surface to form a barrier on the surface. In one embodiment, the method further includes overlaying the barrier by reintroducing an effective amount of the composition onto the galvanized metal surface after one or more time intervals.

In an embodiment, the invention provides a method of inhibiting corrosion in an industrial water system that is at least partially full of water and has one or more galvanized metal surfaces. The method includes adjusting the water in the industrial water system to have a pH from about 6.5 to about 8.2 and introducing an effective amount of a corrosion-inhibiting composition that includes one or more sulfur-based or sulfide-based white rust corrosion-inhibiting compounds into the water of the industrial water system.

Implementing the method may be accomplished when the system is either under load or not under load. If the system is not under load when introducing the corrosion-inhibiting composition, the water in the system is circulated after such introduction for a time interval to contact the sulfur-based white rust corrosion-inhibiting compound with the galvanized metal surfaces of the system to form the barrier on those surfaces. After a sufficient interval, the unloaded system may be turned on or brought under load at any suitable time. If the system is under load when introducing the corrosion-inhibiting composition, the system is operated under load after such introduction for a time interval to contact the white rust corrosion-inhibiting compound with the galvanized metal surfaces of the system and form the barrier on those surfaces.

In an aspect, the invention provides a method for overlaying the barrier formed by the sulfide-based white rust-inhibiting compound. This aspect includes overlaying the barrier while the system is under load or not under load. If the barrier is overlaid while the system is under load, the method includes readjusting the pH of the system to be from about 6.5 to about 8.2 and reintroducing an effective amount of the corrosion-inhibiting composition into the water of the system. The system is then operated under load for one or more additional time intervals and the barrier optionally is re-overlaid after one or more of the additional time intervals.

If the barrier is overlaid while the system is not under load, the method includes readjusting the pH of the system to be from about 6.5 to about 8.2, reintroducing an effective amount of the corrosion-inhibiting composition into the water of the system, and circulating the water of the system for a sufficient interval to contact the sulfide-based compound with the surfaces. After the sufficient interval, the unloaded system may be turned on or brought under load at any suitable time.

Though the invention is particularly relevant to applications such as basins and heat transfer coils of cooling towers, it should be appreciated that the implementation of the method is not limited to such cooling tower applications. Contemplated applications include any system having galvanized metal surfaces. The invention may also be combined with one or more other corrosion or scale inhibiting compositions, such as silicates, borates, molybdates, tungstates, chromate, zinc salts, orthophosphates, polyphosphates, phosphonate/phosphinate, combinations thereof, or any other suitable corrosion or scale inhibiting compound or composition, with or without one or more fluorescent tracer compounds. Such combinations would form a comprehensive corrosion and scale inhibition program, discussed in more detail below.

An advantage of the invention is to provide a method of inhibiting corrosion, especially white rust corrosion, on galvanized metal surfaces.

Another advantage of the invention is to extend the lifespan of galvanized metal surfaces in various applications including industrial water systems.

Yet another advantage of the invention is to provide a one-step passivation method for inhibiting white rust corrosion on galvanized surfaces of industrial water systems.

An additional advantage of the invention is to provide a method for initially pre-passivating with a sulfur-based white rust corrosion-inhibiting composition and post-treating by overlaying the sulfur-based white rust corrosion-inhibiting composition on galvanized surfaces.

It is another advantage of the invention to provide an approach to inhibiting white rust corrosion on galvanized surfaces in industrial water systems that is effective under a range of pH conditions.

It is a further advantage of the invention to provide an approach to inhibiting white rust corrosion on galvanized surfaces in industrial water systems that is effective with water having low ionic content, such as soft water.

It is yet another advantage of the invention to provide a method for inhibiting white rust corrosion on galvanized surfaces in industrial water systems that is effective under elevated carbonate alkalinity.

It is still another advantage of the invention to provide a composition and method for inhibiting white rust corrosion on galvanized surfaces in industrial water systems, which includes one or more sulfur-based or sulfide-based compounds that adsorb and/or bind to the surfaces and which are effective under a range of pH conditions, a range of alkalinity levels, and a range of water hardness levels.

DETAILED DESCRIPTION OF THE INVENTION

The invention provides a method of inhibiting corrosion on a galvanized metal surface. The method includes introducing an effective amount of a corrosion-inhibiting composition onto the galvanized metal surface to form a barrier on the surface. The term "bather" as used herein includes surface modification of the galvanized surface, change of morphology of the galvanized surface, chemical interaction of any of the white rust corrosion-inhibiting compounds with the galvanized surface, or any other similar modification of or interaction with the surface. In one embodiment, an effective amount of the corrosion-inhibiting composition includes from about 0.001 weight percent to about 100 weight percent of the white rust corrosion-inhibiting compound. In a preferred embodiment, an effective amount of the composition includes from about 0.001 weight percent to about 50 weight percent of the compound. In a more preferred embodiment, from about 0.1 weight percent of to about 30 weight percent of the compound of the composition is introduced to the galvanized surface.

It should be appreciated that the white rust-inhibiting compounds described herein can each be used independently, simultaneously, sequentially, alternating between different compounds, or by implementing in any suitable order or fashion. Representative sulfur-based white rust-inhibiting compounds include thiols, bismuthiols, dimerized bismuthiols, polymeric dithiocarbamates, xanthates, and combinations thereof.

In one aspect, introducing the corrosion-inhibiting composition onto the galvanized surface includes incorporating the method into a hot dip manufacturing process. For example, the metal would first be dipped in melted zinc at 450° C. (temperature at which iron/steel and zinc share great affinity) where the metal would be protected with a zinc coating. The next step in the manufacturing process would be to dip the zinc-coated metal into the corrosion-inhibiting composition including the sulfur-based or sulfide-based white rust corrosion-inhibiting compound.

In another aspect, such introduction includes spraying a solution of the corrosion-inhibiting composition directly onto the surface, including surfaces in industrial water systems. In one embodiment, the composition is mixed with a foaming agent to form a mixture and the mixture is subsequently sprayed onto the galvanized metal surface using any suitable spraying device. Foaming agents may include surfactants, such as alkoxylated alcohols, polyethylene glycol, or any other suitable surfactant. In alternative embodiments, the composition may be physically applied onto the surface by rolling using a paint roller or the like, brushing using a paintbrush or the like, swabbing using a mop or the like, or by using any other suitable method or technique.

In another aspect, the corrosion-inhibiting composition is reintroduced onto the surface one or more times after one or more time intervals to "overlay" the barrier or "re-passivate" the surface. Ongoing overlaying steps to renew the corrosion-inhibitory barrier and/or to re-passivate the galvanized surfaces are also contemplated. As determined on a case-by-case basis, the method may include a plurality of different corrosion-inhibiting compositions and overlaying the barrier may include introducing a different one or more of the corrosion-inhibiting compositions onto the galvanized metal surface(s).

In one embodiment, an effective amount of the corrosion-inhibiting composition is introduced into the water of a cooling water circulation system (sometimes referred to herein as "cooling tower") to form a barrier on (or passivate) any galvanized metal surfaces of the system. It should be appreciated that such introduction may be into a new, unused system prior to initial operation of the system or into a running, operational system. The corrosion-inhibiting composition of the invention may be introduced into any industrial water system as either an adjunct treatment in combination with other compositions or programs, such as scale and/or corrosion-inhibiting programs, or as a stand-alone treatment program, as described in more detail herein.

The industrial water system is at least partially full of water and has one or more galvanized metal surfaces. The method includes adjusting the water in the system to have a pH from about 6.5 to about 8.2. In a preferred embodiment, the pH of the water in the system is adjusted to be from about 6.8 to about 7.8. The method further includes introducing an effective amount of a corrosion-inhibiting composition that includes one or more white rust corrosion-inhibiting compounds into the water of the industrial water system.

The corrosion-inhibiting composition typically includes from about 1 ppm to about 10,000 ppm of the white rust corrosion-inhibiting compound. In a preferred embodiment, the composition includes from about 1 ppm to about 1000 ppm of the compound. In a more preferred embodiment, the composition includes from about 1 ppm to about 100 ppm of the compound.

In one embodiment, an effective amount of the corrosion-inhibiting composition is introduced into the water of the industrial water system when the system is operating and under load. In this embodiment, during and after introducing the composition into the system, the system is operated under load (i.e., turned on) for a time interval to contact the white rust corrosion-inhibiting compound with the galvanized surface(s) in the system to form a barrier on the surface(s).

Certain cases may require overlaying the barrier. Such overlaying may be implemented when the industrial water system is operating and under load or when the system has been turned off and thus not under load. In one embodiment, overlaying the barrier includes unloading (i.e., turning off) the system, readjusting the pH of the system, reintroducing an effective amount of the corrosion-inhibiting composition into the water of the system, and circulating the water of the system. In another embodiment, overlaying the barrier includes keeping the system under load, readjusting the pH of the system (as described above) and reintroducing an effective amount of the corrosion-inhibiting composition into the water of the system.

In an embodiment, the method includes a plurality of different corrosion-inhibiting compositions and overlaying the barrier includes introducing a different one or more of the corrosion-inhibiting compositions into the industrial water system.

It should be appreciated that the corrosion-inhibiting composition of the invention is preferably introduced in a pre-passivation process prior to initially starting up the industrial water system. This method is preferred because such application typically provides the highest degree of passivation and protection for the galvanized surfaces in the system. Alternatively, the corrosion-inhibiting composition may be introduced to a currently operating or running system. As described above, such an application may be implemented without turning off the system by leaving the system under load during the passivation process or by turning off and unloading the system.

Although not required to implement this invention, it is contemplated that the corrosion-inhibiting composition may be combined with one or more other corrosion inhibitors, one or more scale inhibitors, one or more fluorescent tracers, one or more water treatment polymers, one or more polyalkoxy compounds, or any other suitable adjunct or additional component. Any such adjuncts may be part of an existing corrosion-inhibitive program to which the invention becomes an additional component or program. Adjuncts may be part of the corrosion-inhibiting composition or may be another separate composition or compositions. In alternative embodiments, such adjuncts may be added simultaneously or sequentially with the corrosion-inhibiting composition of the invention.

Exemplary other corrosion and scale inhibitors include tungstate; molybdate; vanadate; phosphate; phosphonate; phosphinate; silicate; borate; zinc and its salts; polycarboxylates; benzoic acid; the like; combinations thereof; or any other suitable corrosion or scale inhibitors. Exemplary water treatment polymers include polyacrylic acid; polymaleic acid; copolymers and terpolymers of acrylic acid, maleic acid, acrylamide, and acrylamidopropyl sulfonate; prism polymers; sulfonate-based polymers; and terpolymers or copolymers of acrylic acid, acrylamide, sulfomethylated acrylamide, the like, and combinations thereof.

The foregoing may be better understood by reference to the following examples, which are intended to be illustrative and are not intended to limit the scope of the invention.

EXAMPLE 1

Galvanized mild steel metal coupons were tested based on weight after exposure to "Standard 13" make-up water (Ca: 440 ppm (CaCO$_3$); Mg: 220 ppm (CaCO$_3$); M-alkalinity: 340 ppm; Cl$^-$: 312 ppm (CaCO$_3$); (SO$_4$)$^{2-}$: 211 ppm (CaCO$_3$); pH controlled using NaHCO$_3$/Na$_2$CO$_3$ buffer at pH 8.9). Controls and samples included a phosphonate-based scale inhibitor program. The Controls had no additional corrosion inhibitor. Both Samples 1 and 2 included about 10 ppm bismuthiol. Corrosion rates were based on coupon weight after 7 days of exposure and measured in mils per year ("mpy"), as shown in Table I.

TABLE 1

| Treatment | mpy |
| --- | --- |
| Control - A | 11.7 |
| Control - B | 8.4 |
| Sample - A | 2.7 |
| Sample - B | 1.5 |

EXAMPLE 2

Linear polarization electrochemical experiments were performed in a 10 liter cell using galvanized metal surfaces of hot-dipped galvanized ("HDG") rotating electrodes (pH-controlled at pH 7.5). The control and sample included a passivation step with 100 ppm of a phosphonate, phosphate, and polymer-based multi-functional water treatment program. The following synthetic water chemistry including calcium chloride dihydrate, magnesium sulfate heptahydrate, and sodium bicarbonate (based on calculated values) was used: Ca$^{2+}$: 150 to 170 ppm (as CaCO$_3$); Mg$^{2+}$: 75 to 85 ppm (as CaCO$_3$); M-Alkalinity: 85 to 105 ppm (as CaCO$_3$); Cl$^-$: 105 to 120 ppm (as Cl$^-$); and (SO$_4$)$^{2-}$: 72 to 82 ppm (as (SO$_4$)$^{2-}$). The control and sample also included a second step, where the passivated electrodes were exposed to a more extreme corrosive environment, as in Example I above. Initial corrosion rate (from 0 to 24 hours) followed by a longer duration corrosion rate (24 to 72 hours) were measured in mpy. Table II describes the initial and longer duration corrosion rates.

TABLE 2

| Treatment | 0 to 24 hour mpy | 24 to 72 hour mpy |
| --- | --- | --- |
| Control<br>No white rust inhibitor<br>Post-treatment with 100 ppm<br>treatment program as above | 3 to 8 | 3 to 4 |
| Sample<br>Post-treatment in 100 ppm<br>treatment program as above<br>combined with 10 ppm white<br>rust inhibitor (bismuthiol) | ~0.5 to ~0.9 | ~0.3 to 0.5 |

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. A method of inhibiting corrosion on a galvanized metal surface wherein the galvanized metal surface is part of an industrial water system that is at least partially full of water, the method comprising:
 (a) adjusting the water in the industrial water system to have a pH from about 6.5 to about 8.2;
 (b) introducing an effective amount of a corrosion-inhibiting composition into the water of the industrial water system when said system is either under load or not under load, said corrosion-inhibiting composition including a sulfide-based white rust corrosion-inhibiting compound selected from the group consisting of: bismuthiols and dimerized bismuthiols;
 (c) circulating the water of the industrial water system for a time interval to contact the sulfide-based white rust corrosion-inhibiting compound with the galvanized metal surface to form a barrier on the galvanized metal surface, if the system was not under load;
 (d) operating the system for a time interval to contact the corrosion-inhibiting composition with the galvanized metal surface to form a barrier on the galvanized metal surface, if the system was under load;
 (e) overlaying the barrier by:
  i) unloading the system, readjusting the pH of the water in the system to be from about 6.5 to about 8.2, reintroducing an effective amount of the corrosion-inhibiting composition into the water of said system, and circulating the water of the system, or
  ii) keeping the system under load, readjusting the pH of the water in the system to be from about 6.5 to about 8.2 and reintroducing an effective amount of the corrosion-inhibiting composition into the water of said system; and
 (f) operating the industrial water system under load for one or more additional time intervals and repeating step (e) after one or more of the additional time intervals.

2. The method of claim 1, wherein the industrial water system includes a cooling water circulation system.

3. The method of claim 1, including adjusting the pH of the water in the industrial water system to be from about 6.8 to about 7.8.

4. The method of claim 1, wherein the corrosion-inhibiting composition includes one or more polyalkoxy compounds.

5. The method of claim 1, including adding another composition including one or more polyalkoxy compounds to the water of the industrial water system either simultaneously or sequentially with the corrosion-inhibiting composition.

6. The method of claim 1, wherein the corrosion-inhibiting composition includes from about 1 ppm to about 10,000 ppm of the sulfide-based white rust corrosion-inhibiting compound.

7. The method of claim 1, wherein the corrosion-inhibiting composition includes one or more compounds selected from the group consisting of: other corrosion inhibitors, scale inhibitors, fluorescent tracers, and water treatment polymers.

8. The method of claim 1, including adding one or more other corrosion or scale inhibiting compositions that include one or more corrosion or scale inhibiting compounds with or without one or more fluorescent tracer compounds either simultaneously or sequentially with the corrosion-inhibiting composition.

9. The method of claim 1, wherein the corrosion-inhibiting composition includes one or more other corrosion inhibitors selected from the group consisting of: phosphates; phosphonates; phosphinates; silicates; molybdate; tungstate; borate; zinc and its salts; vanadate; chromate; polycarboxylates; and combinations thereof.

10. The method of claim 1, including adding at least one water treatment polymer either simultaneously or sequentially with the corrosion-inhibiting composition, said polymer selected from the group consisting of: polyacrylic acid; polymaleic acid; copolymers and terpolymers of acrylic acid, maleic acid, acrylamide, sulfomethylated acrylamide, and acrylamidopropyl sulfonate; prism polymers; sulfonate-based polymers; and combinations thereof.

11. The method of claim 1, wherein the corrosion-inhibiting composition consists of the sulfide-based white rust corrosion-inhibiting compound selected from the group consisting of bismuthiols and dimerized bismuthiols.

\* \* \* \* \*